Oct. 3, 1972    J. M. CURRENT ET AL    3,695,965
METHOD FOR FEEDING AND WRAPPING SHEET MATERIAL
Filed Jan. 19, 1970    3 Sheets-Sheet 1
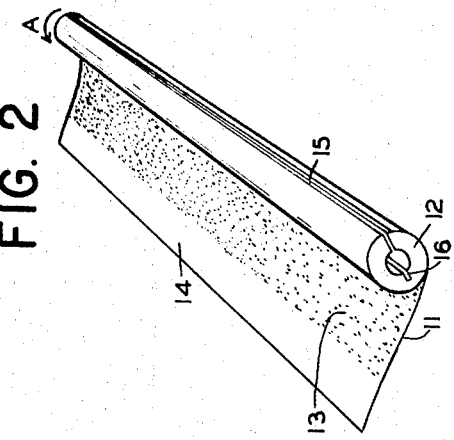
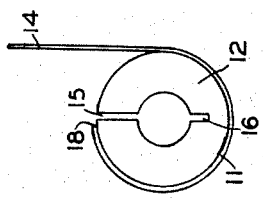
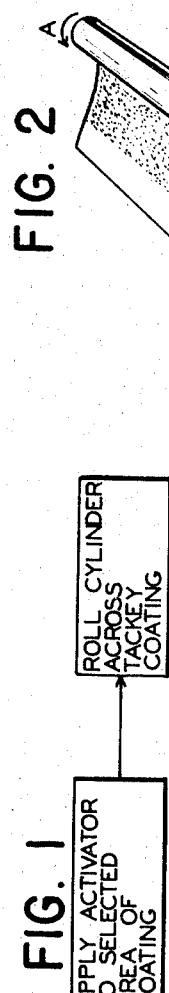
INVENTORS.
JOHN MARVIN CURRENT
RODNEY ROGER SMALLEY
BY
*John A. McKinney*
ATTORNEY Oct. 3, 1972   J. M. CURRENT ET AL   3,695,965
METHOD FOR FEEDING AND WRAPPING SHEET MATERIAL
Filed Jan. 19, 1970                                      3 Sheets-Sheet 2

INVENTORS.
JOHN MARVIN CURRENT
RODNEY ROGER SMALLEY
BY
John J. McKinney
ATTORNEY Oct. 3, 1972  J. M. CURRENT ET AL  3,695,965
METHOD FOR FEEDING AND WRAPPING SHEET MATERIAL
Filed Jan. 19, 1970  3 Sheets-Sheet 3
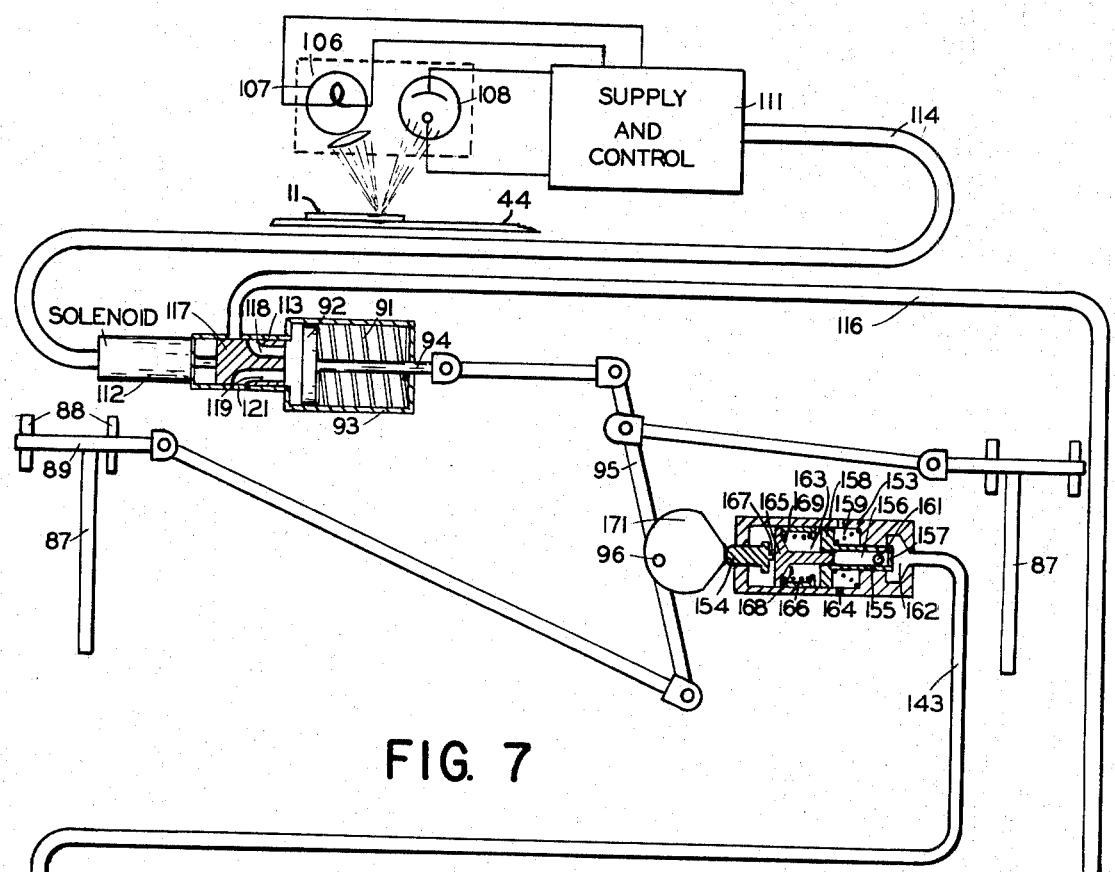
FIG. 7
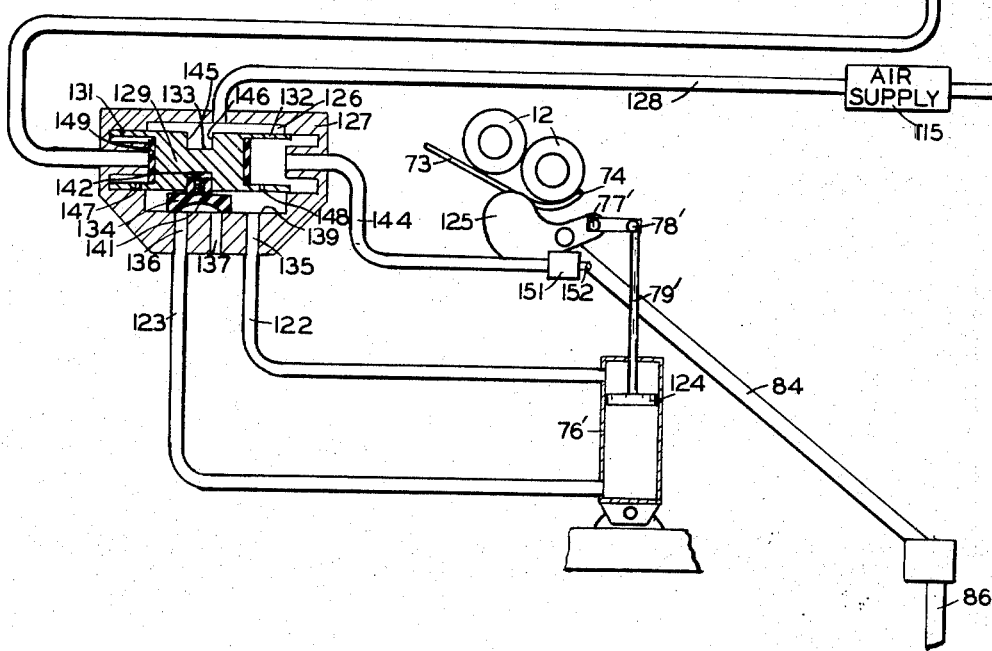
INVENTORS.
JOHN MARVIN CURRENT
RODNEY ROGER SMALLEY
BY
John A. McKinney
ATTORNEY United States Patent Office 3,695,965
Patented Oct. 3, 1972

3,695,965
METHOD FOR FEEDING AND WRAPPING SHEET MATERIAL
John Marvin Current, Jerry City, and Rodney Roger Smalley, Holland, Ohio, assignors to Johns-Manville Corporation, New York, N.Y.
Filed Jan. 19, 1970, Ser. No. 3,598
Int. Cl. B65c 9/04; B65h 81/00
U.S. Cl. 156—187                                    19 Claims

ABSTRACT OF THE DISCLOSURE

Tubes of fibrous, thermal insulation are jacketed with sheet material by adhering the material to the tubes over a major portion of their surface while leaving an exposed longitudinal sector of the wall free of jacketing. The exposed sector is slit to enable the cylinders to be fitted on pipes. A tab extension of the jacket, free of the exposed sector and extending thereacross, enables the mounted tubes to be sealed by adhesive bonding of the tab across the slit. Precut sheets coated with a dormant and activatable adhesive are individually removed from a stack, conveyed across a region in which selected regions of the adhesive in the sheet are activated, conveyed across a reaction region and conveyed to a station in which individual insulation tubes are rolled across each sheet to pick up the tackey surfaced portion thereof. Tubes wrapped with the sheet can be conveyed to a slitter which registers the exposed sector with the slitter blade and advances the sector into the blade longitudinally to sever one wall of the tube.

CROSS-REFERENCE TO RELATED APPLICATIONS

One product resulting from the practice of the method and operation of the apparatus of this invention is the subject of U.S. patent application Ser. No. 3,638 for "Self-Seal System for the Installation of Insulation" by John Paul Mikulak which was filed herewith.

BACKGROUND OF THE INVENTION

Heretofore jacketing has been applied to tubes of fibrous, thermal insulation by manually coating a sheet of jacketing material with adhesive and manually rolling the tube across the sheet so that the tackey adhesive causes the jacketing to be picked up and bonded to the tube. Hand operations of this nature are slow and involve high labor costs. Adhesive is ordinarily applied with a manually manipulated spray gun in a spray booth which obstructs the smooth production flow of insulating tubes, jacketing sheets and jacketed tubes. The supply lines and booths require substantial plant area.

The present invention involves methods of and apparatus for automatic or semiautomatic jacketing of tubular objects with a resultant reduction in labor, enhancement of material flow in a plant, increase in production speed and reduction in production cost.

SUMMARY OF THE INVENTION

Sheet material cut to suitable length for encompassing cylindrical bodies is removed from a stack and provided with a tackey surface as it is advanced along a processing line. A cylindrical body is positioned to intercept the sheet and engage the tackey surface to that the sheet is picked up by the body. Apparatus is provided to advance the sheet linearly from the stack to a station in which the tackey surface is prepared and to confine the region which is tackey to less than that required to encompass the entire outer surface of the cylinder. A cylindrical body to be jacketed is positioned with its longitudinal axis normal to the advance of the sheet and is rotated counter to the direction of advance and across the sheet.

While the process and apparatus are disclosed for utilization of jacketing in sheets precoated with a dormant and non-tackey adhesive which is activated by spraying an activator fluid on the coating it can also be employed where the adhesive is sprayed on jacketing which has not been precoated. Further, the automatic formation of a restricted tackey zone on sheet jacketing can be employed advantageously where insulating tubing is manually rolled upon the sheet to apply it thereto. Automatic slitting of tubes have a jacket tab and utilizing the tab as a means to index the tube relative to the slitter blade can be practiced independently of the remainder of the system as where tubes are jacketed manually.

In one embodiment of the invention particularly applicable to pipe insulation the jacketed tube has a region of jacketing which is not adhered to the tube to expose a sector of the tube wall. This sector is slit longitudinally to afford a means of slipping the tube over a pipe. A tube with the jacketing adhered thereto is advanced with its exposed sector in registry with a slitter blade to automatically form the longitudinal slit. A flap or tab of acketing material having no tackey surface extends tangentially from the tube adjacent the exposed sector. This flap is engaged by indexing guides as the tube is advanced longitudinally so that the tube is properly oriented with respect to the slitter blade.

A feature of the invention includes the means for forming the tackey surface over a limited region of the jacketing sheet.

Another feature resides in the combination of a jacketing sheet precoated with a dormant adhesive with a means to apply an activator fluid to a restricted portion of the coating.

A third feature comprises means presenting the jacketing sheet at a jacketing station in an orientation and direction of advance to facilitate the application of the jacketing to the tube and the wrapping of the jacketing around the tube.

A fourth feature involves mechanism for introducing tubes to the jacketing station automatically.

A fifth feature is means for rotating the tubes counter to the advance of the jacketing to automatically wrap the jacketing thereon.

A sixth feature comprises means feeding tubes with jacketing applied to a slitter.

DESCRIPTION OF THE DRAWINGS

FIG. 1 is a flow diagram of a method of applying jacketing according to this invention;

FIG. 2 is a perspective of a preslit tube of pipe insulation with the jacketing partially applied according to FIG. 1;

FIG. 3 is an end view of a pipe insulating tube jacketed and processed according to this invention;

FIG. 4 is a side elevation of apparatus for automatically activating selected areas of a precoated jacket and for conveying the jacket into a jacketing station;

FIG. 7 is a diagrammatic portrayal of an electrical and pneumatic system for coordinating and controlling the combination of the insulating tubes with jackets having zones of activated adhesive.

DETAILED DESCRIPTION OF PREFERRED EMBODIMENTS

Figure 5:
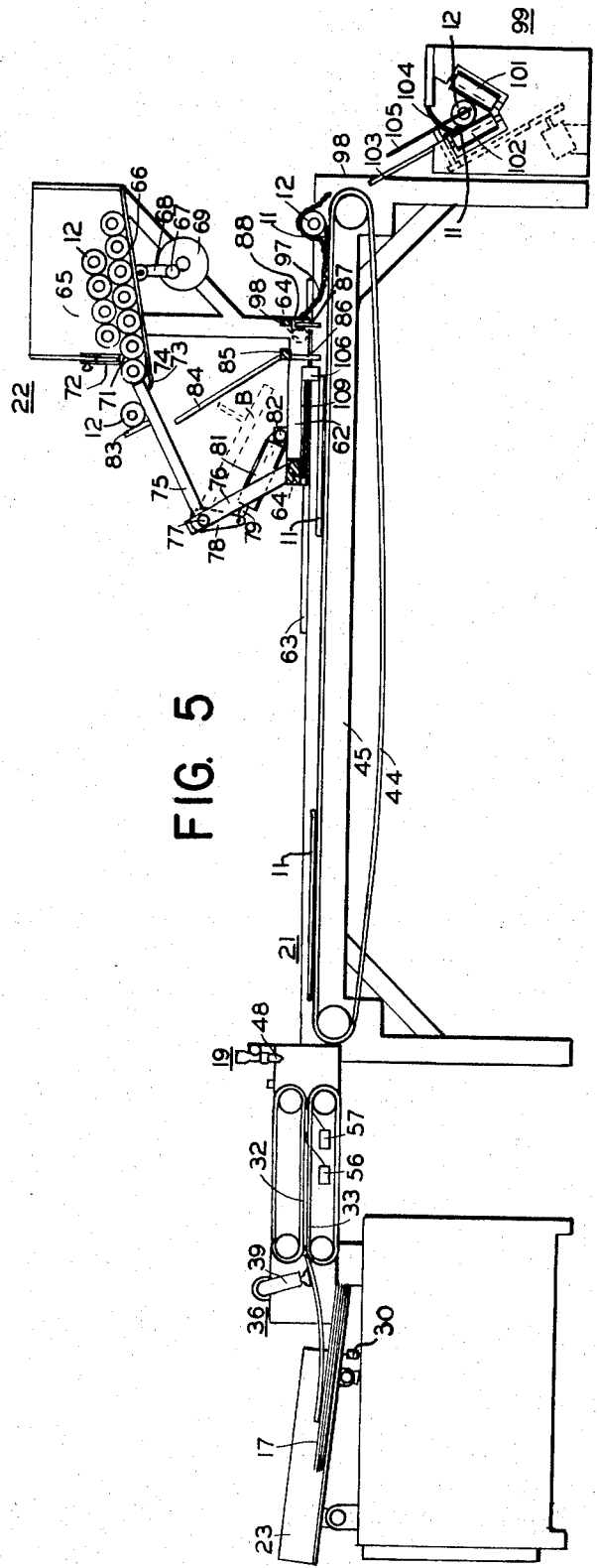
FIG. 5 is a side elevation partially in section of apparatus for jacketing and slitting pipe insulating tubes automatically.

This invention involves wrapping a cylinder of generally circular cross section with a sheet of jacketing which is adhered to a portion or the entire outer face of the cylinder. In the embodiments discussed the cylinder is of tubular form and of a thermally insulating material to adapt it for pipe insulation although it might be of other materials and for other purposes. The jacketing is of a type suitable for vapor barriers for pipe insulation although flexible sheet material of many forms might be applied by the techniques and apparatus to be described.

The cylinder of the illustration is of a fibrous insulating material which most commonly is formed of glass fibers produced by passing glass filaments through small orifices in pots containing molten glass. The filaments are subjected to hot gaseous blasts which soften and attenuate them into small lengths of individual fine fibers. The fibers are collected on a moving formation conveyor and a binder, typically a thermosetting resin, is introduced into the mat. The mat can be formed into cylinders by being cut into lengths corresponding to the length of the total number of convolutions to be employed in the cylinder and then wrapped around and compressed upon a mandrel to form the cylinder having the desired inner and outer diameter and density.

Alternatives to glass fibers formed as described can be employed for thermally insulating tubes. These include other materials which can be fiberized as by spinning, drawing, attenuating and blowing into fine diameter fiber. Such material as silicates of metal oxides, such as rock wools from argillaceous matter or shale, slag wool from metallurgical slags, the commonly known "mineral wools," aluminum silicate fibers and any fibers of the so-called glasses can be formed into suitable cylinders.

The jacketing is of flexible sheet material and can be of various forms, depending upon its intended function. In the example of thermal insulation jacketing a composite sheet of an outer layer of paper, an intermediate reinforcing web of glass fibers, and an inner layer of aluminum foil is employed. The jacketing is coated on the metal foil inner face with an adhesive, advantageously of the phenolic neoprene type having the characteristics that it is inexpensive, can be applied in controlled quantities, is dormant or not tackey, is flexible, is non-flammable and is readily activated. A typical activator for the adhesive is a suitable solvent such as trichloroethane or methyl chloroform.

In the combination of the composite sheet jacketing 11 applied to a glass fiber mat tube 12 to provide a vapor barrier, the use of a coating 13 of phenolic neoprene adhesive can serve to secure the jacket to the tube or it can be employed for that purpose and as a positive seal means for the insulation as installed by activating a region of the coating of the adhesive on a tab or lap 14 which remains deactivated during the factory application of the jacket. In this latter instance the tube 12 is placed upon the pipe by spreading the opposed edges of a longitudinal slit 15 to admit the pipe to the tube interior. Manipulation of the opposed edges by effectively providing a hinge region in the tube wall diametrically opposed to the slit 15 is facilitated by a slit 16 which extends partially through the tube wall from the interior of the tube. With the hinge closed and the tube on a pipe, the tab 14 is made tackey as by application of adhesive activator to the inner face of the portion of jacket 11 left free of the tube 12 and by pressing the tackey surface against the overlapped portion of the jacket to span and close slit 15.

A number of methods are available for fabricating the jacketing 11 on a cylinder 12. When the selectively activated adhesive is intended merely to adhere the jacketing 11 to cylinder 12, it has been found that the adhesive can be applied as a coating of 3 grams per square foot of jacketing. Where the more adverse field conditions are to be met employing the adhesive coating to secure the tab 14 in lapped relation and spanning slit 15, a coating of the adhesive in a density of 6 grams per square foot has been found advantageous to insure good sealing adhesion.

Jacketing sheets can be prepared from rolls of the material precoated with the adhesive conditioned to a non-tackey state by cutting sheets of jacketing 11 of a length exceeding the circumferential length of the cross-section of the tube to be jacketed by an amount providing an adequate sealing tab 14 and a width substantially equal the longitudinal dimension of the tube. Such sheets can be employed individually although automated jacketing is facilitated if they are collected in stacks 17.

Manual application of jackets 11 to tubes 12 can be accomplished by applying adhesive activator fluid to the portion of the coating of dormant adhesive which it is desired to adhere to the tube, and when the coating becomes tackey rolling the tube across the coating to pick up the sheet. In practice, this can be accomplished by placing the precoated sheet on a flat surface with its deactivated adhesive coating upward and by applying the activator fluid to the region to be adhered to the tube by masking or selective coating a portion of the sheet 11. Coating can be by a spray gun, wiping rag, sponge, brush or any other suitable means of applying a metered amount of the activating solvent.

Advantageously, the tube 12 should be slit as at 15 and 16 prior to jacketing manually. However, where automatic slitting as disclosed below, is employed unslit tubes can be jacketed. A region of the coating across the width of the sheet 11 and a length extending from an edge of the with dimension and less than the circumferential length of the cross section of the tube to be jacketed in length is activated on the sheet. Tube 15 is then oriented on the edge of the sheet with its length parallel to the width dimension so than an edge of slit 15 is adjacket the sheet edge. The tube 12 is then rolled across the activated and tackey adhesive as shown by the arrow A of FIG. 2 to pick up the sheet and ultimately adhere all activated areas 13 to the tube 12 as shown in FIG. 3 where tab 14 extends generally tangentially from the outer face of the tube. Where the activated region is of a length essentially three quaters of the circumference of the tube outer face the tabe 14 generally is tangential from a position in quadrature with the first adhered end 18 of the jacket and is parallel to the radial slit 15.

Semiautomatic applications of jacketing can be accomplished in the apparatus of FIG. 4, where sheets of jacketing 11 positioned with their deactivated coatings uppermost are individually removed from a stack 17 and advanced linearly to an activating station 19 and then across a dwell region 21 to a jacketing area 22. Stack 17 is maintained in a tray 23 having sides and a bottom and mounted along its rear edge on a hinge 24. An elevating hydraulic cylinder and piston 25 is journaled at 26 on cabinet 27 and piston rod 28 is journaled at 29 to the underside of tray 23 at its leading edge. Means, such as a timer controlled pneumatic or hydraulic system (not shown), periodically raises the leading edge of tray 23 by admitting actuating fluid to cylinder 25 and then lowers the tray to complete the cycle.

The uppermost sheet on stack 17 is removed during each cycle of elevating and lowering tray 23 and is transferred to a conveyor 31 comprising a plurality of upper and lower belts 32 and 33 trained over grooved shafts 34 and 35 so they have parallel, adjacent runs between which the sheet 11 is advanced to activating station 19. A vacuum pickup 36 comprising an array of vacuum cups 37 on a manifold 38 suspended on arms 39 radially extending from an oscillatory shaft 41 journaled on frame 42 of conveyor 31. A pneumatic line 43 extends from manifold 38 and can continuously or periodically draw a vacuum on the manifold.

Pickup 36 operates in conjunction with elevator 25. Arms 39 are rotated to a clockwise limit as shown in dashed lines in FIG. 4 while the tray 23 is in its initial lowered position and after the tray has been elevated, vacuum is imposed on cups 37 to pickup the uppermost sheet. They 23 is then lowered while the vacumm is maintained and arms 39 are rotated to a counterclockwise limit as shown in full in FIG. 4. In this position the leading edge of sheet 11 is introduced between the arrays of upper and lower conveyor belts 32 and 33 and the vacuum is released to permit the sheet 11 to be drawn between the runs of belts 32 and 33.

Synchronization of the pickup operation with the elevation of the tray 23 can be either by timing mechanism (not shown) programed with the elevator or by limit switches (not shown) which sense the travel of the stack to engage the pickup cups 37 for drawing the vacuum and the retreat of the stack for actuating the oscillating drive (not shown) for shaft 41. Conveyor belts 32 and 33 are continuously run during operation of the apparatus so that shafts 34 rotate counter-clockwise and shafts 35 rotate clockwise at the same speed and the adjacent runs of belts 32 and 33 advance from the pickup 36 to the activating station 19.

One form of top sheet feeder drive is a pneumatic cylinder driving (not shown) a crank to shaft 41 in a manner similar to the tube release shaft to be described with respect to FIG. 7. A recycling poppet valve 30 having its actuating plunger, oriented below tray 23 to be engaged by the return of the tray bottom to its lowered position momentarily bleeds static air pressure from a first pilot chamber of a bleeder type four-way valve (not shown) to shift the pressurized air supply from one end of the crank drive cylinder to the other. When the crank reaches its opposite limit it bleeds static air pressure from a second pilot chamber of four-way valve by releasing a poppet valve (not shown) to shift the pressurized air back to the one end of the crank drive cylinder and return the crank to its initial position. This return of the pilot valve is permitted since the recycling poppet valve 30 is of a character to be maintained closed following its opening on the stroke of its plunger by the tray bottom even though its plunger is held depressed and it can be reopened only by release and redepression of the plunger on the next cycle of tray elevator.

As the sheet 11 emerges from conveyor 31 it is placed on conveyor 44 which can be a belt extending the width of the sheet and slidingly driven over a table 45 by drive shaft 46 driven by motor 47. An array of spray heads 48 transverse of the conveying path are mounted on a support rod 49 secured to frame 42 of conveyor 31. Activator fluid is supplied to the heads 48 by flexible conduits 51 from manifold 52 which is coupled to a reservoir (not shown) which can be maintained under pressure to force the activator from the heads. The activator pattern from heads 48 coats a region of the sheets 11 across their width as they emerge from between belts 32 and 33. Release of the activator from heads 48 is by means of needle valves 53 which are supplied with and controlled by pneumatic pressure through rod 49 from a solenoid operated valve 54 by means of tubing 55.

Valve 54 is controlled by an electrical circuit including limit switches 56 and 57 having actuating arms 58 and 59 protruding between belts 33 into the path along which sheet 11 is carried by conveyor 31. The switch arms 58 and 59 are spaced apart the length of travel equal to the length of the tab 14 to be formed in the jacketing procedure and are arranged so that the solenoid valve 54 is open only in response to the coincidence of operation of both switches by the engagement of their arms with a sheet 11. Where the apparatus is to be employed on a range of jacket lengths, as for a range of outer diameter of insulating tube, and the length of tab to be formed varies, the limit switch sensing positions are made adjustable along the length of conveyor 31. Further, the switch arm 59 of switch 57 is located according to the speed of conveyor 31 and the reaction time of applicator 19 so as to provide preactivation distance which anticipates the travel of sheet 11 in the delay interval between its signal and the initiation of the cutting off of the spray of activator from heads 48.

As the leading edge of sheet 11 advances through the conveyor 31, it engages and operates switch arm 58 with no effect at that time. Further advance of sheet 11 engages arm 59 with its leading edge to establish an actuating circuit for solenoid operated valve 54. Continued advance of the leading edge of sheet 11 locates it beneath heads 48 as the valve 54 is opened to cause needle valves 53 to open and initiate the spraying of activator fluid. As the trailing edge of sheet 11 passes arm 58, the circuit for valve 54 causes it to close thereby initiating closure of needle valves 53 and the cut off of activator fluid. A region across the trailing edge of the sheet 11 thereby receives no activator fluid and its adhesive coating remains deactivated as indicated by the region 14 of sheet 11 in FIG. 2 having no stippling.

The sheet 11 with its leading portion coated with activated adhesive advances on belt 44 through a reaction region 21 of sufficient length to enable the activator to become effective and render the adhesive coating to which it was applied tackey. It is then carried to a jacketing region 22 where, in the semiautomatic jacketing process, an operator manually places a tube of pipe insulation on the leading edges of the sheet 11 and rolls the tube against the direction of advance of the sheet. Conveniently the operator is stationed at the end 61 of table 45 facing the advancing jacketing sheets 11. He places the tubes 12 with the margin of their slits 15, if pre-slit, on the leading edge of the sheet 11 and their longitudinal axis normal to the direction of advance. The jacketing is completed by rolling the tube toward the applicator 19 whereby the tackey face of the jacket is picked up, initially as shown in FIG. 2 and finally as shown in FIG. 3.

The method of and apparatus for advancing individual jacketing sheets 11 to a jacketing station can also be applied to processes where adhesive is applied at applicator station 19. In this latter instance, no precoating of adhesive is necessary. A hood is desirable with suitable exhausting means (not shown) for the applicator station 19 when the adhesive spray results in dangerous or noxious vapors or particle suspensions in the adjacent atmosphere.

Figure 6:
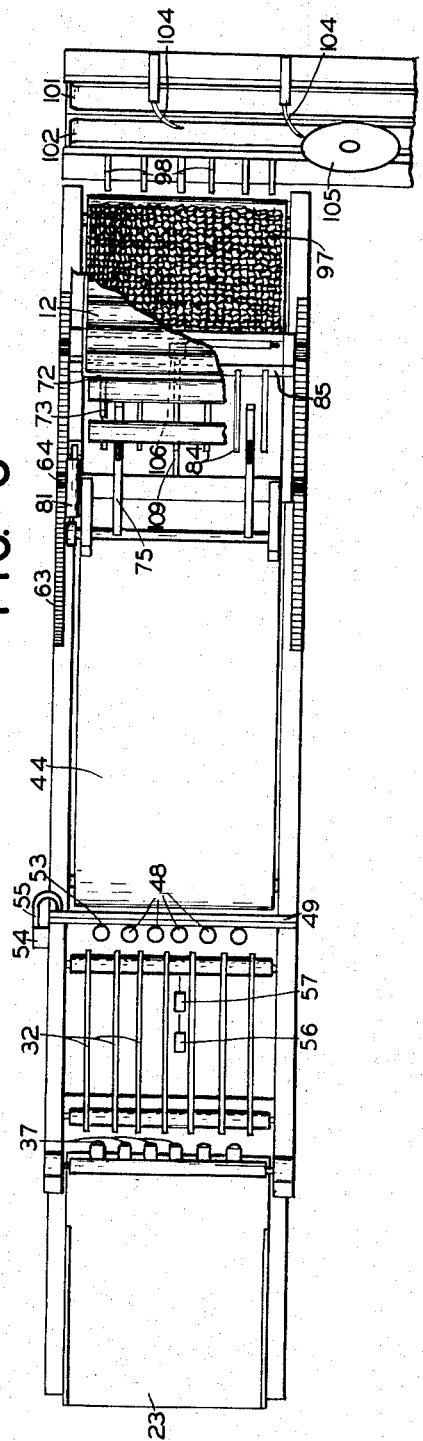
FIG. 6 is a schematic plan view on a reduced scale with portions broken away of the apparatus of FIG. 5.

A more completely automatic apparatus for jacketing and slitting tubes of pipe insulation is shown in FIGS. 5 and 6. The unstacking of sheets, their feed to an activator fluid application station, the means of applying activator fluid or adhesive and limiting the region over which the sheet coating is tackey, and the conveyor to the jacketing station all correspond to the apparatus described with respect to FIG. 4. Accordingly, the apparatus of FIG. 4 is generally represented in FIG. 5 employing the same reference characters as in FIG. 4.

In the apparatus of FIG. 5, tubes 12 are brought into engagement with the jacketing after a delay such that the coating is afforded an adequate interval following application of the activator to become tackey (tack time) depending upon the adhesive, the activator and the processing parameters such as temperature and humidity. Tack time is adjusted by adjustment of the speed of conveyors 44 and the travel distance for the activated coating from application station 19 to jacketing station 22. The former is adjusted by adjusting the speed of the drive either at motor 47 or its drive coupling to shaft 46. Travel is adjusted by adjustment of the position along the conveyor 44 of the equipment forming jacketing station 22. This adjustment is by a carriage 62 traveling on guides 63 along the conveyor table 45. The guides 63 can be racks and the carriage can be mounted on pinions 64 suitably journaled thereto and engaged with the racks.

The tube manipulating mechanism on carriage 62 comprises a tube magazine 65 in the form of a hopper or bin having a bottom 66 which can be moved, as by means of eccentric 67 and link 68 driven by rotating motor 69, to agitate the supply of tubes 12 therein and insure their feed through aperture 71 defined by adjustable gate 72. Gate 72 enables the apparatus to accommodate a range of tube diameters, the height of aperture 71 being slightly in excess of a diameter. A feed ramp 73 defined by spaced rods having upturned ends 74 carries tubes from aperture 71 to a release position from which they can be passed individually to the conveyor 44. A tube is released by lifting it free of the ramp ends 74.

Tube release comprises spaced arms 75 interdigitating with the rods of ramp 73 and journaled for rotation in bracket 76 extending from carriage 62. Arms 75 are mounted on shaft 77 having a crank 78 driven by piston rod 79 and cylinder 81 pivoted at 82 to frame 62. The piston and cylinder are supplied with a suitable drive fluid under pressure (by means not shown) controlled (by means not shown) to maintain arms 75 in the position shown whereby the return of arms 75 from their previous tube feed cycle lifts the lead tube on ramp 73 free of the ramp and the end of arms 70 holds the following array of tubes short of the end 74 of the ramp 73. The next tube feed cycle lowers arms 75 to free the lead tube on ramp 73 and permits it to roll to the ends 74 of the ramp. Each return of arms 75 lifts the leading tube free of ramp 73 and permits it to roll under influence of gravity along arms 75 to stops 83 extending generally at right angles to the arms to form a tube cradle at a radius around shaft 77 sufficiently beyond ends 74 of ramp 73 to permit the released tube to pass the ramp ends 74. Each feed stroke of arms 75 is by valving controls which bleed fluid from the upper end of cylinder 81 and apply fluid under pressure to the lower end whereby piston rod 79 is extended to rotate shaft 77 clockwise. This lowers arms 75 so that the tube cradled between the arms and stops 83 rolls free and into inclined guide rods 84. At the end of the clockwise stroke arms 75 are in position B as shown in FIG. 5 and controls (not shown) such as a poppet actuated by a cam on shaft 77 causes fluid to be bled from the lower end of cylinder 81 and to be fed to the upper end until arms 75 are returned to position shown in full.

Inclined guide rods 84 are mounted on cross bar 85 secured to carriage 62. Depending from bar 85 are back stops 86 in the form of vertical rods extending toward conveyor 44. Back stops 86 cooperate with gates 87 to confine a tube 12 on the conveyor 44 to a region of a length in the coveying direction slightly exceeding the tube diameter. Where a range of tube sizes are to be jacketed in the apparatus, the region between back stops 86 and gates 87 is adjustable whereby it can be defined with appropriate dimensions for the tube size being processed. Adjustment of the length of the region is afforded by adjusting the position of support bar 85 along carriage 62 as by means of sliding guides and screw clamps (not shown).

The insulating tube 12 is oriented on conveyor belt 44 with its axis normal to the direction of advance of the belt and is maintained at its initially deposited position by a pair of opposed gates 87. As best seen, in FIG. 6, gates 87 are mounted to project toward belt 44 adjacent each longitudinal edge of the belt from overhead supports 88 which can be reciprocatable bars 89 guided for reciprocation transversely of the conveying path from a position maintaining opposed gates 87 in the path along which the tubes are carried by the conveyor 44 to a position beyond the ends of tubes on the conveyor.

Gates 87 can be biased by spring 91, as shown in FIG. 7, to their closed position and can be opened by pressure fluid, conveniently air, operating on piston 92 in cylinder 93 to displace piston rod 94 to the right. Linkage 95 pivoted at 96 and coupled to piston rod 94 provides the drive to open gates 87 by moving them outward. Control of the gates is coordinated so that a tube is held at the gates until a jacket is advanced to a position at which it is essentially contacted with the tube. This can be accomplished by sensing the approach of the jacket photoelectrically and actuating the release of the gates as will be described with respect to FIG. 7.

A tube on the conveyor 44 is released just prior to the entry of the leading edge of a jacket sheet into the region defined by stops 86 and gates 87. It is carried into the wrapping region by the advance of conveyor 44 at the conveyor speed until it encounters the drag curtain 97. Curtain 97 can be a relatively heavy sheet of flexible material having sufficient friction with respect to tubes 12 so that the tubes are rolled between the drapped curtain and the conveyor 44 and therefore advance in the conveying direction at approximately half the speed of the conveyor. Conveniently, the curtain 97 can be of metal links as a sheet chain suspended from a head bar 98 secured to carriage 62 down stream of the gates 87.

With tube retarded and set in rotation by curtain 97, the closely following jacket with its now tackey leading zone on its upper face overtakes the tube 12 and advances beneath the rolling tube to be picked-up thereby and carried around the tube until the entire tackey zone of adhesive is adhered around the tube. The tube is enclosed as shown in FIG. 3 at this point in its processing with a flap 14 free of the cylindrical outer surface. Conveyor 44 carries the jacket wrapped tube 12 to its end 98 and ejects it into a suitable repository (not shown) or, as shown in FIGS. 5 and 6 a conveyor 99 which carries it to a slitter.

When tubes are jacketed automatically, they can be fed from magazine 65 in unslit condition and slit in their unjacketed wall adjacent the jacket flap 14. Conveyor 99 comprises a pair of endless belts 101 and 102 having the conveying surfaces of adjacent runs essentially at right angles to each other along their lengths and advancing at the same speed. These belts receive jacketed tubes from an array of guide rods 103 at and below the end 98 of conveyor 44 so that the axis of the tube which was normal to the direction of advance of conveyor 44 is parallel to the direction of advance of conveyor 99. Guides which can be in the form of spring biased fiingers 104 pickup the flaps 14 of the jacketed tubes and rotate them against the face of belt 102 whereby the tubes are rotatably indexed for the blade 105 of the slitter positioned downstream of the conveyor 99 from the guides. As in the case of the magazine gate 72 and the tube positioning zone, the slitter blade position is adjustable to accommodate a range of tubes. The plane of slitter blade 105 is spaced from the conveying run of belt 102 essentially a radius of the tube 12. In addition the depth of cut of the blade 105 is adjustable to accommodate various wall thicknesses for the tubes by adjusting its spacing toward and away from the conveying run of belt 101. Slit and jacketed tubes are issued to a suitable receptable or additional conveyors (not shown) at the end of conveyor 99.

FIG. 7 shows a control circuit for a system of the general form shown in FIG. 5. In the embodiments of FIGS. 5, 6 and 7 the tube gating operation is instituted by the approach of the leading edge of a preconditioned jacket sheet 11 on conveyor 44 and the closure of the gates 87 is instituted by the passage of the trailing edge of a jacket sheet. The delivery of a tube to the conveyor follows the closure of the gates 87 so that a tube is positioned on the conveyor 44 immediately behind the trailing edge of a jacket sheet. These operations are controlled photoelectrically by a unit 106 comprising a light source 107 directing light onto conveyor 44 and a photocell 108 responsive to a change of light intensity from that received from the surface of conveyor 44 to that received form a sheet of jacketing 11 on the conveyor. Unit 106 is mounted adjustably on carriage 62 as by mounting arm 109 so that it can be moved with respect to the carriage parallel to the direction of conveying and is aligned with and above the path along which jacket sheets are conveyed with its light projected downward and its cell responsive to light changes below it.

A power supply and signal responsive control 111 is coupled to unit 106 by suitable conductors and supplies an energizing signal to solenoid 112 of valve 113 over condutors 114. Valve 113 controls the position of piston 92 in cylinder 93 and thus the position of gates 87 by passing air under pressure from supply 115 and conduit 116 to cylinder 93 when valve body 117 is retracted to provide communication of air through passage 118. When valve body 117 is in the extended position, exhaust passage 119 bleeds air from cylinder 93 to exhaust duct 121.

In operation, an advancing sheet of jacketing 11 is sensed by cell 108 to cause solenoid 112 to retract valve body 117 and thereby extend piston 92 to open gates 87. When the trailing edge of sheet 11 passes from beneath cell 108 the valve body 117 is extended as shown as by a biasing spring (not shown) to vent cylinder 93 and enable spring 91 to retract piston rod 94 to close gates 87.

Delivery cylinder 76' has feed lines 122 and 123 at each end for driving piston 124 and piston rod 79' pivotally coupled to crank 78' on feed actuating shaft 77'. Feed mechanism 125 comprises an array of cams spaced along shaft 77' in non-interfering relationship to feed ramp 73. Thus, the feed mechanism of FIG. 7 while somewhat similar to that of FIGS. 5 and 6 differs in that a clockwise rotation of shaft 77' raises an insulation tube free of ramp end 74 and permits it to drop on drop guide rods 84.

Piston 124 is displaced pneumatically by air from supply 115 passed to cylinder 126 of a four-way air operated valve 127 through conduit 128. A barrel 129 of valve 128 in the form of opposed cups 131 and 132 forming pistons of a pilot valve coupled by bridge 133 is shiftable axially of cylinder 126 to transfer slide block 134 between one of ports 135 and 136 and exhaust port 137. Slide block 134 has a smooth sealing fit with face 139 and contains a cavity 141 which spans the port 137 and one set of the ports 135 or 136. It is maintained in sealing relationship to face 139 by bias spring 142. In the position shown, valve 127 vents line 123 to atmosphere and applied pressurized air from supply 115 to line 122 through the cavity around the central portion of barrel 129 thereby tending to shift piston 124 from the upper end of its stroke to a lower position in cylinder 76'.

Valve 127 is shifted by bleeding pressure from lines 143 or 144 to atmosphere. This enables the high pressure in the main valve cavity to be effective on the ends 145 or 146 of cups 131 and 132 respectively to displace the barrel 129. This force is developed by the pressure unbalance and effective areas upon which the pressure is imposed. A restricted flow of high pressure air is admitted to the interior of each cup 131 and 132 through passages 147 and 148 so that in the static condition, the pressures on the inner and outer faces of the two opposed cups are balanced. When pressure is bled from line 143, the force on face 145 exceeds that of the pressure in the interior of cup 131 and barrel 129 is shifted to the left. This shifts slide 134 to the left to expose port 135 to the high pressure of the valve interior and connects port 136 to exhaust port 137 via cavity 141. A seal 149 at the bottom of cup 131 closes the port to 143 and the bleed hole 147 permits high pressure air to enter the cup and build up the pressure in its interior.

Bleeding of line 144 to atmosphere reduces the pressure in cup 132 to produce an unbalanced force from the high pressure on face 146. This shifts barrel 129 to the right, transferring slide 134 to vent port 135 and expose duct 136 to high pressure from the interior of 127. Piston 124 is thereby driven upward in cylinder 76'. Each time a pilot port 143 or 144 is bled to atmosphere while the barrel is at a position spacing the cup 131 or 132 associated with that port from its seated condition the barrel will be shifted toward the port and will cause a corresponding shift of the control valve slide 134.

Valve 127 is controlled by the bleeding functions of poppet valve 151 having the characteristic that it bleeds air from line 144 while its spring biased plunger 152 is depressed and by recycling poppet valve 153. Valve 153 bleeds line 143 during the depressing travel of plunger 154 at a critical point in that travel and until pressure in the line has been reduced and thereafter reseats to close line 143, even though the plunger 154 is maintained displaced, until the plunger has been extended and again depressed. Valve 153 is shown in its closed condition with plunger 154 depressed. Valve 153 includes a stem 155 having a hollow bore 156 closed at its end 157 and a flange 158 against which a spring 159 is biased. An aperture 161 from cavity 162 into bore 156 provides communication to inner cavity 163 when stem 155 is displaced to expose aperture 161 to cavity 162. Inner cavity 163 is coupled to exhaust ports 164 when stem 155 is displaced. A toggle stem 165 is mounted in sleeve 166 and is actuated by cam 167 on plunger 154. It is shown coaxial with and telescoped within bore 156 as in the seated condition with its plunger depressed. Toggle stem 165 is biased by spring 168 and when recycled is cocked relative to the longitudinal axis of the valve and the direction of travel of plunger 154. Depressing plunger 154 initially causes stem 165 to bear upon and depress stem 155 to a valve opening condition. Thereafter, its camming face 169 causes it to longitudinally align itself with the valve axis. Thus, it initially exposes port 161 and exhaust ports 164 to bleed line 143. With stem 165 axially aligned with bore 156 to enter that bore, steam 155 is biased closed by spring 159. Thus plunger 154 can remain depressed and plunger 155 will reclose the valve.

In the present control the feed of tubes 12 is actuated by the closing of gates 87 following the passing of photoelectric unit 106 by a jacket sheet 11. Spring return of piston rod 94 to the position shown causes link 95 to rotate shaft 96 in a counter-clockwise direction thereby carrying cam 171 on shaft 96 to a position depressing plunger 154 and opening recycled valve 153 momentarily. With line 143 bled to atmosphere, barrel 129 moves to the left, as shown to admit high pressure air to the line 122 and the upper end of cylinder 76' while line 123 is vented to the atmosphere. Piston 124 is driven downward rotating shaft 77' clockwise so that cam surfaces 125 lift the first tube 12 free of ramp end 74 while retaining the next tube to permit return of cam 125. When crank 78' or a corresponding cam on shaft 77' engages and depresses plunger 152, line 144 and the pilot valve cup 132 are bled to atmosphere causing barrel 129 to move to the right. This shifts slide 134 to apply high pressure to line 123 and the lower end of cylinder 76' while it bleeds the upper end of cylinder 76' through line 122 to atmosphere. Piston 124 is immediately driven upward to rotate shaft 77' counter-clockwise to its limit and another tube 12 is permitted to roll to the end 74 of ramp 73. In this condition the recycling valve 153 remains closed with its plunger 154 depressed, the four-way control valve 127 has barrel 129 and slide 134 displaced to the right, poppet valve 151 is closed and piston 124 is at its upper limit of travel so that the system is prepared for another cycle when the gates 87 are again opened to reset valve 153 and then are reclosed.

It is to be appreciated that the methods and apparatus of this invention can be employed as a system or as individual subcombinations for the several steps of fabricating a jacketed and slit tube of pipe insulation. Thus the method of precoating a jacketing with a dormant but activatable adhesive and utilizing that adhesive by application of an activator fluid could be employed without automatic apparatus to produce a tackey surface upon which a tube is rolled to pickup the jacket sheet. The apparatus for producing the localized tackey region can apply an adhesive as where the jacketnig sheets have not been precoated. That apparatus has been used with conveyor 44 with attendants manually positioning and rolling tubes 12 on the tackey jacketing sheet. The automatic tube positioner and rolling mechanism could be preceded by a manual application of the tackey jacket surfacing and could be followed by a manual slitting operation.

Further, the various details of the apparatus lend themselves to modification, alternatives, and variations. For example, the penumatic drives might be hydraulic or electromagnetic drives. The work piece manipulating elements and combinations can be varied as in the illustrated tube release variations of FIGS. 5 and 7. Accordingly, it is to be understood that the above disclosure is to be read as illustrative of the present invention and not in a limiting sense.

What is claimed is:

1. The method of jacketing cylindrical bodies comprising the steps of entirely coating sheet jacketing material with a deactivated and reactivatable adhesive, activating only a restricted area of said adhesive coating immediately prior to the engagement of said sheet jacketing material with a cylindrical body, and wrapping said sheet jacketing material around said body with said activated coating in contact therewith whereby said sheet jacketing is adhered to said body by said activated coating.

2. The method according to claim 1 wherein said sheet material has a length adapted to be positioned parallel to the longitudinal axis of a cylindrical body to which it is to be applied and a width of a dimension exceeding the perimeter of a cross-section of the body normal to the longitudinal axis, and wherein said activation is restricted to a first region of said adhesive coating across the length of said sheet extending from first longitudinal edge thereof a width less than the perimeter of a cross-section of the body normal to the longitudinal axis of the body whereby a tab of said sheet jacketing which is not adhered to said body or said sheet jacketing extends along a longitudinal edge of said sheet.

3. The method according to claim 2 wherein said entire activated region of said coating is contacted with said cylindrical body.

4. The method according to claim 3 wherein said cylindrical body has a hollow interior extending throughout its length, including the step of longitudinally slitting said cylindrical body from its exterior to its interior, and positioning said first longitudinal edge of said activated region adjacent the slit and the remainder of said region in engagement with unslit portions of said body.

5. The method according to claim 1 wherein said deactivated adhesive coating is a non-tackey adhesive which is reactivatable by a solvent therefor, and said activation is by application of a solvent to said adhesive coating.

6. The method according to claim 5 wherein said coating is reactivated by spraying solvent therefor on a selected region of said coating.

7. The method of jacketing a cylindrical body which comprises advancing a rectangular sheet of jacketing material along a path, said sheet having a length along the direction of advance of at least the circumferential length of the perimeter of a cross-section of said body normal to the longitudinal axis of said body and having a width transverse of the direction of advance at least the length of said body to be jacketed; sensing the advance of the sheet along said path; forming a tackey surface in a localized region on one face of the sheet of jacketing while the sheet advances along said path in correlation with the advance of the sheet whereby the tackey surface is restricted to a zone across the sheet and of a length of the sheet in the direction of advance less than the circumferential length of the perimeter of a cross-section of said body normal to the longitudinal axis of said body; contacting the tackey surface of the sheet along a line of the outer face of the body parallel to the longitudinal axis of the body while the sheet advances along said path; and rotating said body around its longitudinal axis counter to the direction of advance of the jacket along the path while the sheet advances along said path.

8. The method according to claim 7 wherein the tackey surface is confined to a zone on the sheet of a length in the direction of advance substantially equal to three-quarters of the circumferential length of the perimeter of a cross-section of said body normal to the longitudinal axis of said body, whereby a portion of the jacketing sheet having a non-tackey surface extends tangentially from said body generally parallel to a radius of the body to the opposite edge of said jacketing sheet adhered to said body, and whereby a longitudinally extending region of the outer surface of the body has no adhering jacket.

9. The method according to claim 8 wherein the zone of the tackey surface is applied beginning at the leading edge of the advancing jacket sheet whereby a tab free of the body is formed along the trailing edge of the sheet.

10. The method according to claim 8 including the step of longitudinally slitting the body in the region having no adhering jacket subsequent to applying the jacket.

11. The method according to claim 10 including the steps of advancing the jacketed body longitudinally and generally normally of the path of advance during jacketing; indexing the jacketed body around its longitudinal axis during said last mentioned advance to align the region having no adhering jacket with a slitting blade; and moving the body and the blade relative to each other to longitudinally slit the body.

12. The method according to claim 7 including the steps of withdrawing the sheet of jacketing material from a stack of like sheets; and introducing the withdrawn sheet into the path of advance.

13. The method according to claim 7 including the steps of applying a coating of deactivated and reactivatable adhesive to the sheet of jacketing material; and activating the coating to form the tackey surface.

14. The method according to claim 7 including the steps of slitting a wall of the cylindrical body longitudinally; and positioning the cylindrical body with the line of contact adjacent the slot.

15. The method according to claim 7 including the step of longitudinally slitting the body subsequent to the application of the jacketing.

16. The method of jacketing a cylindrical body which comprises applying a coating of deactivated and reactivatable adhesive to a rectangular sheet of jacketing material having a side of a length at least the circumferential length of the perimeter of a cross-section of the body normal to the longitudinal axis of the body and having a side of a length at least the length of said body to be jacketed; advancing said jacketing material along a path; spraying a solvent for said deactivated adhesive on the coating to activate the coating and form a tackey surface in a localized region on one face of the sheet of jacketing while the sheet advances along said path; contacting the tackey face of the sheet along a line of the outer face of the body parallel to the longitudinal axis of the body while the sheet advances along said path; and rotating said body around its longitudinal axis counter to the direction of advance of the jacket along the path while the sheet advances along said path.

17. The method according to claim 16 including the step of delaying the contacting of said body with said sprayed coating for an interval sufficient to permit said coating to become tackey.

18. The method of producing thermal insulation for pipe which comprises forming a tube of fibrous mat; adhering a jacket of sheet material to the tube; maintaining a region longitudinally extending along the outer surface of the tube free of the adhering jacket; and slitting the tube wall in the region free of adhering jacket subsequent to applying the jacket.

19. The method according to claim 18 wherein a tab of jacketing material extends generally tangentially from the tube adjacent the region free of adhering jacket, including the steps of indexing the jacketed body around its longitudinal axis by means of the tab to align the region free of adhering jacket with a slitting means; and moving the slitting means and the body relative to each other to slit the tube wall.

References Cited

UNITED STATES PATENTS

| 2,958,437 | 11/1960 | Mengis. | |
|---|---|---|---|
| 3,121,253 | 2/1964 | Varrial | 156—455 X |
| 2,464,937 | 3/1949 | Paisley | 156—457 |
| 1,563,147 | 11/1925 | Bartlett | 156—455 |
| 3,447,987 | 6/1969 | Williams | 156—357 X |
| 3,386,350 | 6/1968 | Grodberg | 156—457 X |

BENJAMIN A. BORCHELT, Primary Examiner

J. M. HANLEY, Assistant Examiner

U.S. Cl. X.R.

156—193, 447, 448, 458